United States Patent [19]
Rath et al.

[11] 3,959,058
[45] May 25, 1976

[54] METHOD AND APPARATUS FOR BUTT-WELDING TUBULAR PLASTIC MEMBERS TO EACH OTHER

[75] Inventors: Lucien M. Rath, Milwaukee; James L. Clark, Whitefish Bay, both of Wis.

[73] Assignee: Plastronics, Inc., Milwaukee, Wis.

[22] Filed: Nov. 8, 1974

[21] Appl. No.: 522,045

[52] U.S. Cl. ............................... 156/272; 156/304; 156/380
[51] Int. Cl.² ................... B29C 19/02; B29C 19/00
[58] Field of Search .................... 156/272, 304, 380

[56] References Cited
UNITED STATES PATENTS

| | | | |
|---|---|---|---|
| 2,816,596 | 12/1957 | Welch | 156/273 |
| 3,462,336 | 8/1969 | Leatherman | 156/380 |
| 3,558,397 | 1/1971 | Clark | 156/273 |
| 3,706,620 | 12/1972 | Dykstra | 156/273 |

*Primary Examiner*—Douglas J. Drummond
*Attorney, Agent, or Firm*—Michael, Best & Friedrich

[57] ABSTRACT

The apparatus is comprised of three basic parts, a mold member, an electrode pin member mounted inside the mold member and an electrode ring member mounted on the outside of the mold member. The mold member is made of an insulating, non-metallic material and is provided with a central cavity in which the pin member is mounted. The electrode pin member is made of a conductive metallic material and is provided with a cooling passageway system in the interior thereof. A pair of tubular members of plastic material are inserted into the open end of the mold cavity with their ends abutting each other in an area opposite the end portion of the pin member, with the electrode ring member positioned in the same general area. Radio frequency energy is transmitted between the electrode pin member and the electrode ring member and simultaneously therewith air under pressure is introduced into the passageway system inside the pin. The radio frequency energy will generate heat in the material of the plastic tube at the abutting ends thereof, causing the tubes to be welded together. The air flowing in the passageway inside the pin is directed to the areas of the two tubes adjacent the abutting ends thereof to thereby localize the heat produced in the desired area, namely where the ends of the tube abut each other.

4 Claims, 2 Drawing Figures

U.S. Patent   May 25, 1976   3,959,058
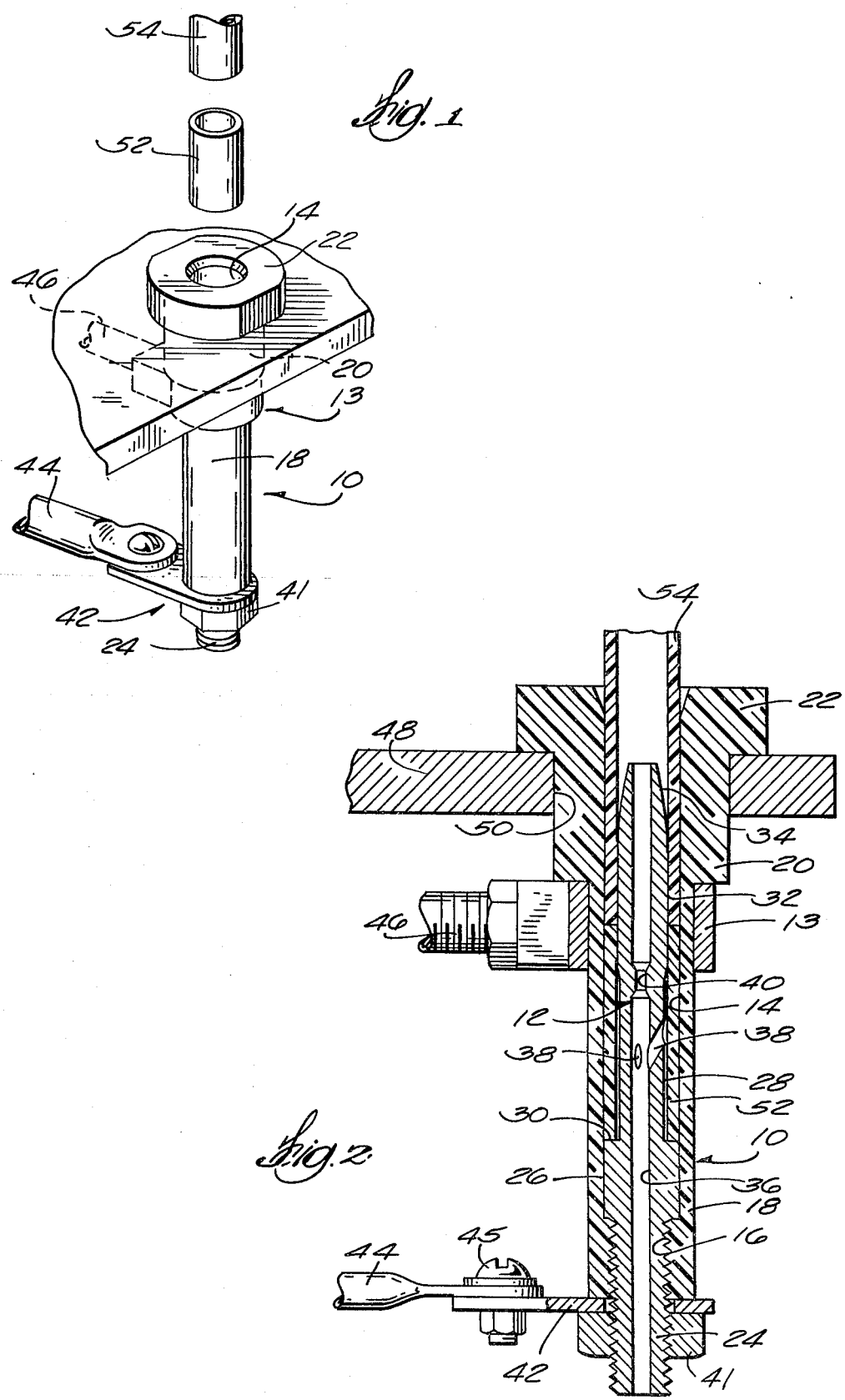

METHOD AND APPARATUS FOR BUTT-WELDING TUBULAR PLASTIC MEMBERS TO EACH OTHER

BACKGROUND OF THE INVENTION

The present invention relates to a method and apparatus for butt-welding tubular plastic members to each other, and more specifically to butt-welding tubes made of vinyl plastic by radio frequency energy. The principal disadvantages of prior methods and apparatus is their failure to produce welds of consistent bonding characteristics and to do so in a minimum period of time and with a minimum requirement as to operator expertise. The present invention is designed to overcome these objections.

SUMMARY OF THE INVENTION

The apparatus is comprised of a mold member of insulating material having a cylindrical cavity therein, an electrode pin member of conductive metallic material mounted concentrically within and spaced from the mold member and an electrode ring member mounted on the outside of the mold member opposite the upper end portion of the pin member. A pair of plastic tubes are inserted into the mold member with the pin member extending inside thereof with the end portion of the pin member positioned at the point where the two tubes abut each other. Radio frequency energy is passed between the electrode pin and the electrode ring member causing the ends of the tubes to be welded together. A cooling passageway system is provided inside the electrode pin member for directing cooling air to the areas of the two tubes adjacent their abutting ends to thereby localize the heat produced by the radio frequency energy to the desired area, namely, the area where the ends of the tubes abut each other.

DESCRIPTION OF THE DRAWINGS

FIG. 1 is a perspective view of the apparatus of the present invention; and

FIG. 2 is a vertical sectional view of the apparatus shown in FIG. 1.

DESCRIPTION OF THE PREFERRED EMBODIMENT

Referring now to the drawings in detail, the apparatus of the present invention is comprised of three basic parts, namely, a mold member 10, an electrode pin member 12 mounted inside mold member 10 and an electrode ring member 13 mounted on the outside of mold member 10.

Mold member 10 is made of an insulating non-metallic material preferably teflon and is provided with a cylindrical cavity 14 therein and a threaded opening 16 in the lower end thereof. Member 10 has cylindrical outside surfaces 18, 20 and 22 of increasing diameter.

Pin member 12 is made of a conductive metallic material preferably brass and has a threaded end 24, a cylindrical external surface 26, a cylindrical external surface 28 of reduced diameter providing a locating shoulder 30 therebetween, a cylindrical external surface 32 having a diameter slightly greater than surface 28 and a tapered tip portion 34. Pin member 12 is also provided with a central passageway 36, a plurality of inwardly angling ports 38 connecting the passageway with surface 28 and a restriction 40 in the passageway between ports 38 and the upper end of the passageway 36.

The threaded end 24 of electrode pin 12 is connected to a source of radio frequency energy by means of a strap 42, a nut 41 and a conductor 44 fastened to the strap by a nut and bolt assembly 45. Similarly, the electrode ring member 13 is connected to a source of radio frequency energy by a conductor 46. The source of radio frequency energy employed may be of any conventional type such as an industrial heater. The threaded end 24 of pin 10 is connected to a source of air under pressure (not shown) so that the central passageway 36 in the pin can be pressurized when desired as will be described hereinafter. The entire assembly described above is mounted in an opening 50 in a radio frequency tuner plate 48.

To use the welding apparatus described above a first tubular member 52 (generally vinyl plastic) is inserted into the open top end of mold cavity 14 of mold member 10 until its lower end abuts locating shoulder 30.

The next step is to insert a second tubular member 54 (also of vinyl plastic) into the mold cavity 14 until the end thereof abuts the end of tube 52. With the tubes 52 and 54 positioned as shown in FIG. 2 the abutting ends thereof will be positioned immediately adjacent to the electrode ring member 13.

The next step in the butt-welding procedure is to energize electrode pin 12 and electrode ring 13 from a source of radio frequency energy. Simultaneously with, or just prior to, such energization, air under pressure is introduced into passageway 36. The radio frequency energy passing between pin 12 and ring 13 will generate heat in the material of tubes 52 and 54 at the abutting ends thereof causing the ends of the tubes to be welded together.

Some of the air flowing up the passageway 36 will flow out the open end of pin 12 and some will flow up through ports 38 into the space 56 between surface 28 of the pin and the inside surface of tube 52. The presence of the restriction 40 in passageway 36 serves to force more air through port 38 than would be the case where no such restrictions were used. The air flowing through ports 38 into space 56 will cool the material of tube 52 in the lower portion thereof. Similarly, the air flowing out through the tip 34 of pin 12 will cool the material of tube 54 in the area adjacent the tip. The cooling action described above will localize the heat produced by the radio frequency energy to the desired area, namely, the area where the ends of the tubes 52 and 54 abut each other.

With the apparatus described above, it is possible to produce a well-controlled weld between the abutting ends of two plastic tubes wherein the weld can be produced rather quickly and with a relatively unskilled operator.

We claim:

1. Apparatus for butt-welding tubular plastic members to each other comprising:

a mold member of insulating material having a cylindrical cavity therein;

an electrode pin member of conductive metallic material mounted concentrically within and spaced from the said mold member, said electrode pin member having a central passageway therethrough for introducing cooling fluid into said pin member, said pin member further having a plurality of ports connecting the central passageway therein with the external surface of said pin member at a point below said upper end portion of said pin member, the outside diameter of the surface to which said ports connect being slightly less than the outside diameter of said upper end portion of said pin member;

an electrode ring member mounted on the outside of said mold member opposite the upper end portion of said pin member; and means for passing radio frequency energy between said electrode pin and said electrode ring member.

2. Apparatus for butt-welding according to claim 1 in which there is a restriction in said central passageway in said pin member, said restriction located between said ports and the upper end of the passageway.

3. Apparatus for butt-welding tubular plastic members to each other comprising:

a mold member of insulating material having a cylindrical cavity therein of sufficient length to accommodate a pair of tubular plastic members in abutting end-to-end relationship;

an electrode pin member of conductive metallic material mounted concentrically within and spaced from said mold member;

an electrode ring member mounted on the outside of said mold member opposite the upper end portion of said pin member; and means for passing radio frequency energy between said electrode pin and said electrode ring member;

said electrode pin member having a locating shoulder formed at the base thereof for properly positioning a plastic tubular member inside said mold member with one end of said plastic tubular member abutting said locating shoulder and with the other end of said plastic tubular member located inside said electrode ring member.

4. A method of butt-welding tubular plastic members to each other comprising the steps of:

a. positioning a pair of tubular members of plastic material in end-to-end abutting relationship inside a cylindrical cavity formed in a mold member made of insulating material;

b. positioning an electrode pin member formed of a metallic conductive material inside said tubular members a sufficient distance whereby the end portion of said pin member is positioned at the abutting edges of said tubular members;

c. positioning an electrode ring member around the outside of said mold member in the area where said tubular members abut each other; and d. passing radio frequency energy between said electrode pin member and said electrode ring member to thereby heat the abutting ends of the tubular members and cause them to be welded together; and e. cooling the areas of the two plastic tubular members adjacent the abutting ends thereof during step (d) by directing a flow of cooling fluid to such abutting areas.

* * * * *